United States Patent [19]

Carpenter

[11] Patent Number: 4,711,428
[45] Date of Patent: Dec. 8, 1987

[54] HYDRAULIC LEVELING DEVICE

[75] Inventor: Willis M. Carpenter, Albuquerque, N. Mex.

[73] Assignee: Hydra-Level, Inc., Phoenix, Ariz.

[21] Appl. No.: 911,492

[22] Filed: Sep. 24, 1986

[51] Int. Cl.⁴ .............................................. B66F 3/24
[52] U.S. Cl. .................................................. 254/423
[58] Field of Search ....................... 254/45, 423, 89 H; 280/6 R, 6 H

[56] References Cited

U.S. PATENT DOCUMENTS

| | | | |
|---|---|---|---|
| 2,837,312 | 6/1958 | Troche | 254/423 |
| 3,362,683 | 1/1968 | Hansen | 254/423 |
| 4,235,542 | 11/1980 | Paterik | 254/423 |

OTHER PUBLICATIONS

RVA Jacks System (advertisement); RVA Company, 1822 Rockhoff Road, Escondido, CA 92026.
A & E Mark V and Hydraulic Levelers (advertisement); A & E Systems, Inc., 3100 W. Segerstrom, Santa Ana, CA 92704.

Primary Examiner—Robert C. Watson
Attorney, Agent, or Firm—Rodey, Dickason, Sloan, Akin & Robb

[57] ABSTRACT

Hydraulic leveling device and system for leveling trailers, mobile homes, platforms and other equipment. The device and system of the invention comprise a hydraulic cylinder, a support leg connected to the hydraulic cylinder, and a wheel for pivoting the support leg upwards into a storage position.

15 Claims, 5 Drawing Figures

HYDRAULIC LEVELING DEVICE

BACKGROUND OF THE INVENTION

This invention relates to a hydraulic leveling system. The leveling system is an improvement over prior art leveling systems in that the support leg of the system of the invention easily pivots into and out of a storage position. The leveling device and system of the invention are useful when the object to be leveled needs to be frequently moved, such as a trailer or mobile home.

Leveling of equipment or objects is often necessary to achieve adequate performance, stability, safety, and comfort. Trailers, mobile homes and concession stands which have gas stoves, in particular, need to be accurately leveled because the gas burners do not work properly and create a hazard if they are tilted. Refrigerators in mobile homes or on platforms will become damaged if not leveled properly. Off-highway, farm, agricultural and mining equipment are other examples of equipment which needs to be leveled to attain adequate performance and safety. Circus carnival equipment, including platforms and food concession stands, is another example of equipment which needs to be frequently leveled.

Typically, leveling of objects or equipment in the prior art is achieved by one or several people placing boards or blocks under the supports of the equipment. Such a method is often very strenuous, time consuming, and inaccurate.

Another prior art leveling method is the use of hand or hydraulic jacks placed under the equipment. Again, even with the help of such jacks, the leveling process can be strenuous, time consuming, and inaccurate.

Several improved leveling devices and systems in the prior art are those manufactured by A & E Systems, Inc., of Santa Ana, Calif. and RVA Company, of Escondido, Calif. These prior art leveling devices each have a hydraulic cylinder, a bracket for mounting the device to the bottom of the object to be leveled, and large springs to pivot the hydraulic cylinder upwards into a storage position. However, there are several problems with these prior art devices: First, the devices will become damaged if the object is moved, for example, when a driver accidentally drives off without first putting the leveling devices in their "storage" position. Second, the hydraulic cylinder has only "power down" motion; the springs are required to raise the cylinder. This is ineffective, for example, if the support leg is stuck in the mud, soft soil, or frozen ground. And, third, the springs or spring supports tend to wear out or break easily because they have to support the entire weight of the hydraulic cylinder which pivots upward into the storage position.

Accordingly, it is an object of the present invention to provide an improved hydraulic leveling device and system which is easy and inexpensive to manufacture and operate.

It is a further object of the present invention to provide a hydraulic leveling device with improved wearability and which is not easily damaged.

Yet another object of the invention is to provide improved means for pivoting a hydraulic leveling device into and out of a storage position so that the object to be leveled can be easily moved.

Other objects and further scope of applicability of the present invention will become apparent from the detailed description to follow, taken in conjunction with the accompanying drawing.

SUMMARY OF THE INVENTION

This invention relates to a system and device for leveling equipment and objects. The invention is especially useful for objects which frequently need to be moved and leveled.

The device of the invention comprises a support leg, attachment means for attaching the support leg to a hydraulic cylinder, and a wheel which is positioned off-center on the support leg for causing pivoting of the support leg relative to the hydraulic cylinder. Preferably, the wheel can be freely rotated and slightly repositioned on the support leg. The system of the invention comprises the device of the invention and a hydraulic cylinder. The hydraulic cylinder is mounted, in a vertical position, to the underneath side of the object to be leveled.

During operation of the system of the invention in leveling an object, the hydraulic cylinder rod is vertically lowered from its casing, thereby causing the support leg to pivot down and then lower vertically. After the support leg reaches the ground, the hydraulic action causes the object to move upward.

When the object is to be moved, it is desirable to pivot the support leg upward so that it is not as close to the ground. This is accomplished by the device and system of the invention in that the support leg pivots upward, up to 90 degrees, relative to the hydraulic cylinder. The hydraulic cylinder remains in a vertical stationary position. The force to cause this rotation is created when the wheel of the device of the invention makes contact with the bottom of the hydraulic cylinder casing; the off-center positioning of the wheel causes the leg to pivot upward. Preferably, the device of the invention comprises wheel adjustment means for slightly repositioning the wheel which enables an operator to control the degree of pivoting upward of the support leg.

DESCRIPTION OF THE PREFERRED EMBODIMENT

This invention relates to an improved hydraulic leveling device and system. The improvement comprises means for pivoting a support leg, connected to a hydraulic cylinder, into a storage position.

Throughout the specification and claims, the term "hydraulic cylinder" is used to describe, generally, a complete hydraulic cylinder (rod and casing). When a more detailed description is necessary to explain the device and system of the invention, the term "casing" is utilized to describe the outer cylinder and the term "rod" is utilized to describe the inner rod which slides in and out of the casing of the hydraulic cylinder.

Figure 1:
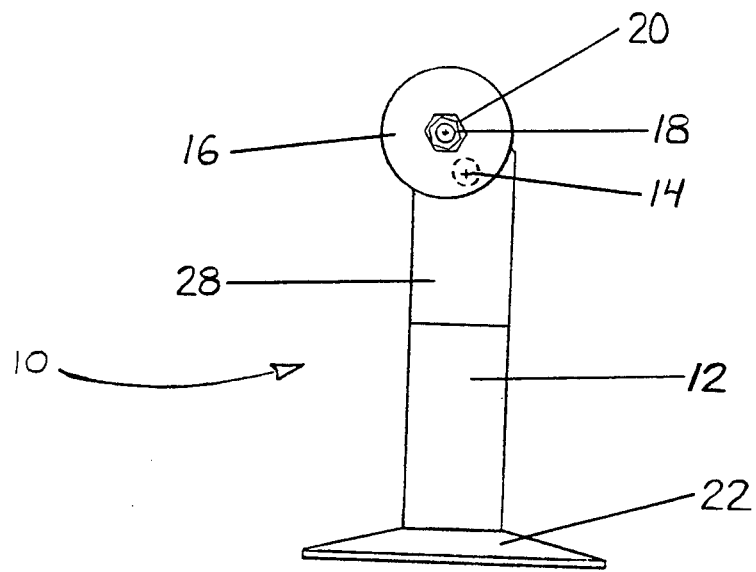
FIG. 1 of the drawing is a front view of the device of the invention.
Figure 2:
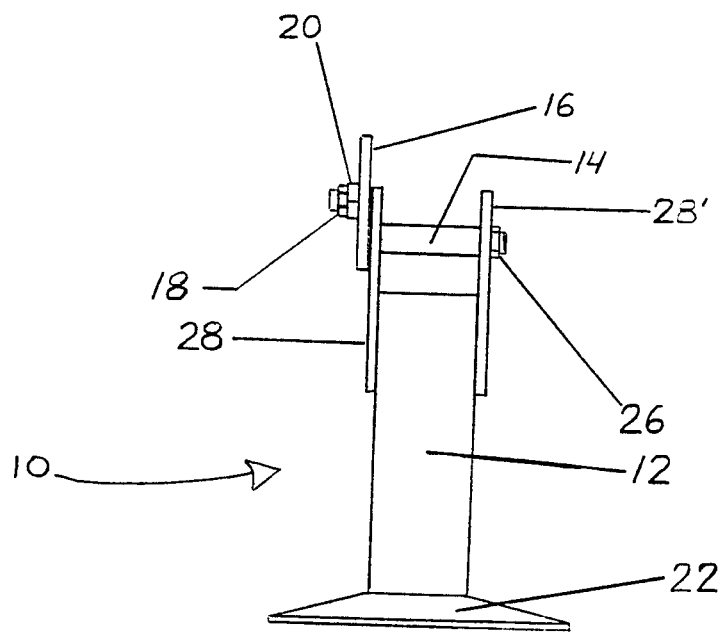
FIG. 2 of the drawing is a side view of the device of the invention.

FIGS. 1 and 2 of the drawing illustrate front and side views of the device 10 of the invention. The device 10 comprises a support leg 12, means 14 for attaching the support leg 12 to a hydraulic cylinder, and a wheel 16 for pivoting the support leg 12 into an upward or "storage" position.

Figure 3:
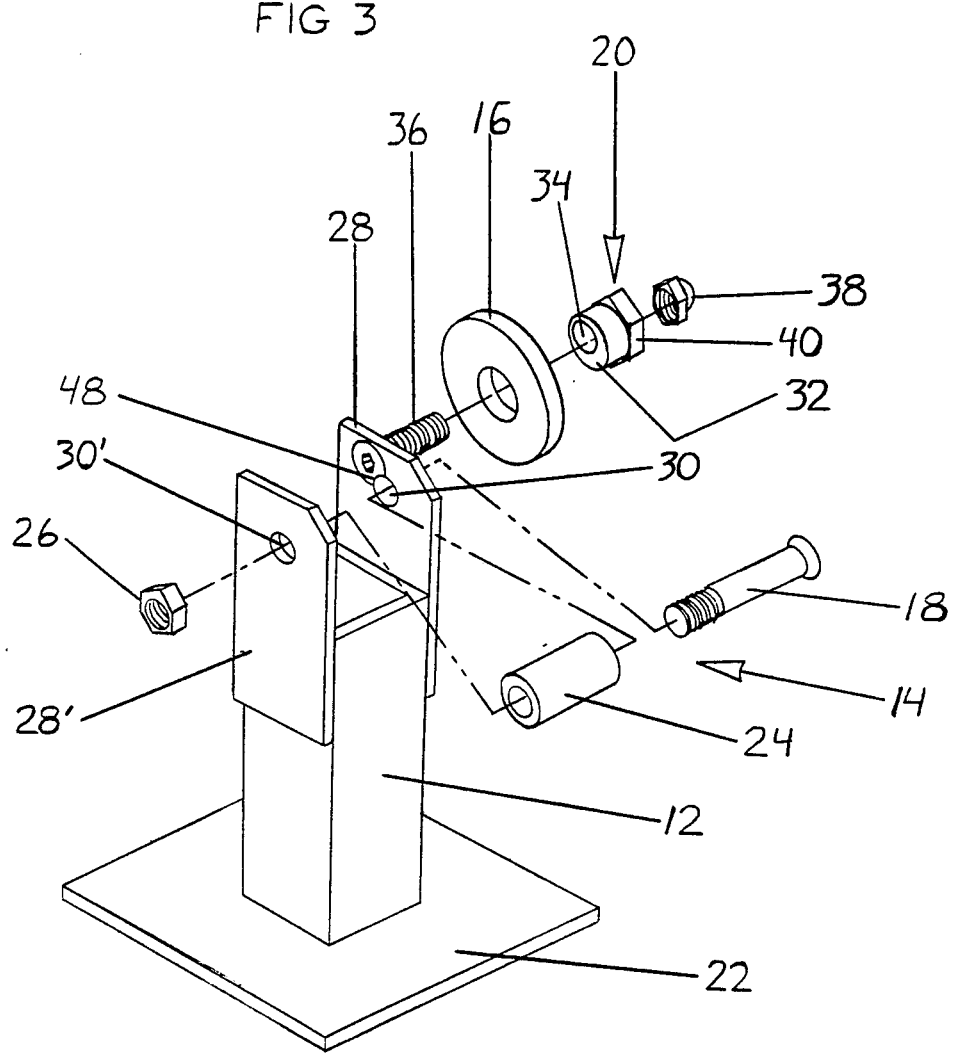
FIG. 3 of the drawing is an exploded perspective view of the component parts of the device of the invention.

The support leg 12 of the device of the invention preferably has extended sides 28 and 28' which attach to the hydraulic cylinder. These extended sides 28 and 28' may be formed integrally with the support leg 12 or they may be separate plates or pieces which are attached to the support leg 12, as shown in FIGS. 2 and 3. Preferably, the device of the invention further comprises a support pad 22 at the bottom of the support leg 12 for increased stability and to prevent the support leg 12 from sinking into the ground.

FIG. 3 of the drawing is an exploded perspective view of the preferred means for attaching the component parts of the device of the invention together and for attaching the device to a hydraulic cylinder. The device 10 is preferably attached to the bottom end or lower portion of a hydraulic cylinder rod by attachment means 18, such as a a bolt, which passes through an opening 30 in one extended side 28 of the support leg 12, through a sleeve 24, through the other extended side 28' of the support leg 12, and is held by a nut 26. The bolt 18 and sleeve 24 preferably pass through a hole in the bottom of the hydraulic cylinder rod. The bolt 18 and sleeve 24 do not pass through the hydraulic cylinder casing; the hydraulic casing and rod must be free to move apart.

Although FIG. 3 illustrates a bolt, nut and sleeve combination for the hydraulic cylinder attachment means 14, other attachment means, common to the art, may be utilized in the device of the invention. For example, a smooth rod which is held by a cotter pin, would be equally effective as the attachment means. The attachment means must be smooth enough to allow the support leg to pivot up to 90 degrees with respect to the longitudinal axis of the hydraulic cylinder.

The wheel 16 of the device of the invention is attached to one extended side 28 of the support leg 12 (and not to the hydraulic cylinder) by wheel attachment means 36, so that the plane of the wheel 16 is parallel to the plane of the extended side 28 of the support leg 12. Preferably, the wheel 16 is attached so that it can be freely rotated around the attachment means 36. The attachment means 36 shown in FIG. 3 comprises a bolt which is held by a nut 38. Although FIG. 3 illustrates a bolt and nut combination for the wheel attachment means, other attachment means, common to the art, such as a rod and cotter pin, may be utilized in the device of the invention.

The hydraulic cylinder attachment means 14 passes perpendicularly through and intersects the longitudinal or vertical axes of the support leg 12 and the hydraulic cylinder. The wheel attachment means 36 also passes perpendicularly through the support leg, but does not intersect the longitudinal axis. This off-center or offset positioning allows the support leg 12 to pivot around both the wheel attachment means 36 and the hydraulic cylinder attachment means 14 axes. The pivotal action is most effective when the wheel 16 is positioned on the support leg 12 at a point which is approximately 45 degrees, measured from the central axis of the hydraulic cylinder attachment means 14 and the longitudinal axis of the support leg 12. The positioning of the wheel 16 is best shown in FIGS. 1 and 3-5.

Preferably, the device of the invention further comprises adjustment means for slightly adjusting the position of the wheel, which in turn, affects the degree of pivoting of the support leg upward. FIG. 3 illustrates this embodiment in which the preferred wheel adjustment means 20 for adjusting the position of the wheel 16 comprises a sleeve 32 with an offset opening 34. The wheel attachment means 36 passes through the extended side 28 of the support leg 12 which holds the wheel 16, through the wheel 16, through the sleeve 32, and is held by a nut 38. The sleeve 32 preferably has tool contact faces 40, as shown in FIG. 3, so that a wrench can easily be used to rotate the sleeve 32. When the sleeve 32 is rotated, the position of the wheel 16 will move slightly due to the offset opening 34. This is important when the device 10 is in operation; when the support leg 12 pivots upward from the hydraulic cylinder, the degree it will pivot can be changed by slightly moving the position of the wheel 16 via the wheel adjustment means 20.

When the wheel adjustment means 20 is utilized in the device of the invention, the wheel attachment means 36 is preferably fixed to the extended side 28 of the support leg 12 so that the wheel attachment means 36 will not rotate once the wheel 16 position is adjusted. In such an embodiment, the wheel attachment means 36 may be welded to the support leg 12, or, as shown in FIG. 3, notched so that the notch 48 is seated on the hydraulic cylinder attachment means 14 and will thus not move. Other means, common to the art, for permanently fixing the wheel attachment means 38 to the support leg 12, may be utilized in the device of the invention.

In an alternative embodiment, the device of the invention 10 does not contain wheel adjustment means for moving the position of the wheel 16. In such an embodiment, the degree to which the support leg 12 pivots upwards is fixed.

Figure 4:
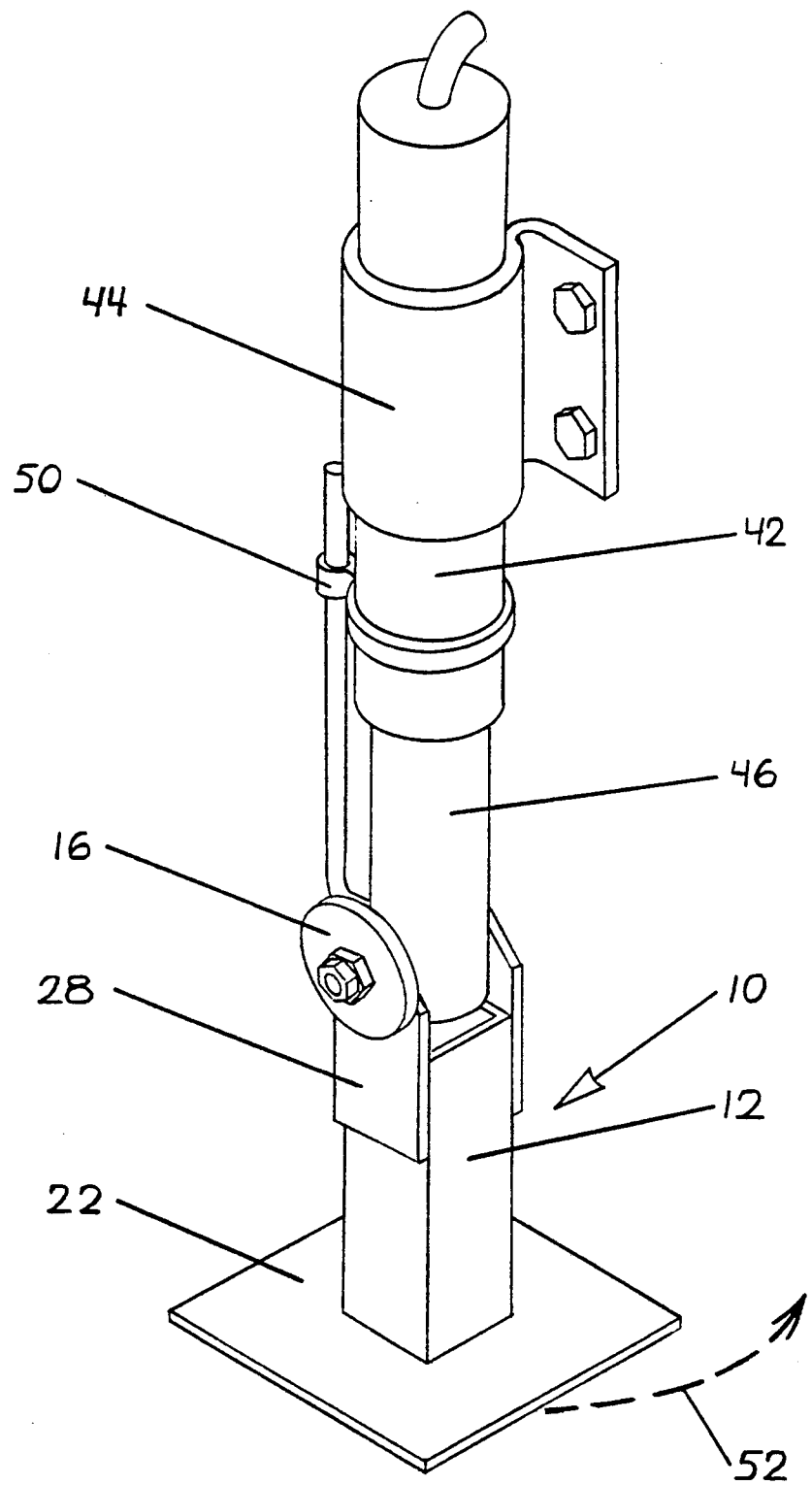
FIG. 4 of the drawing is a perspective view of the system of the invention in a "down" position.
Figure 5:
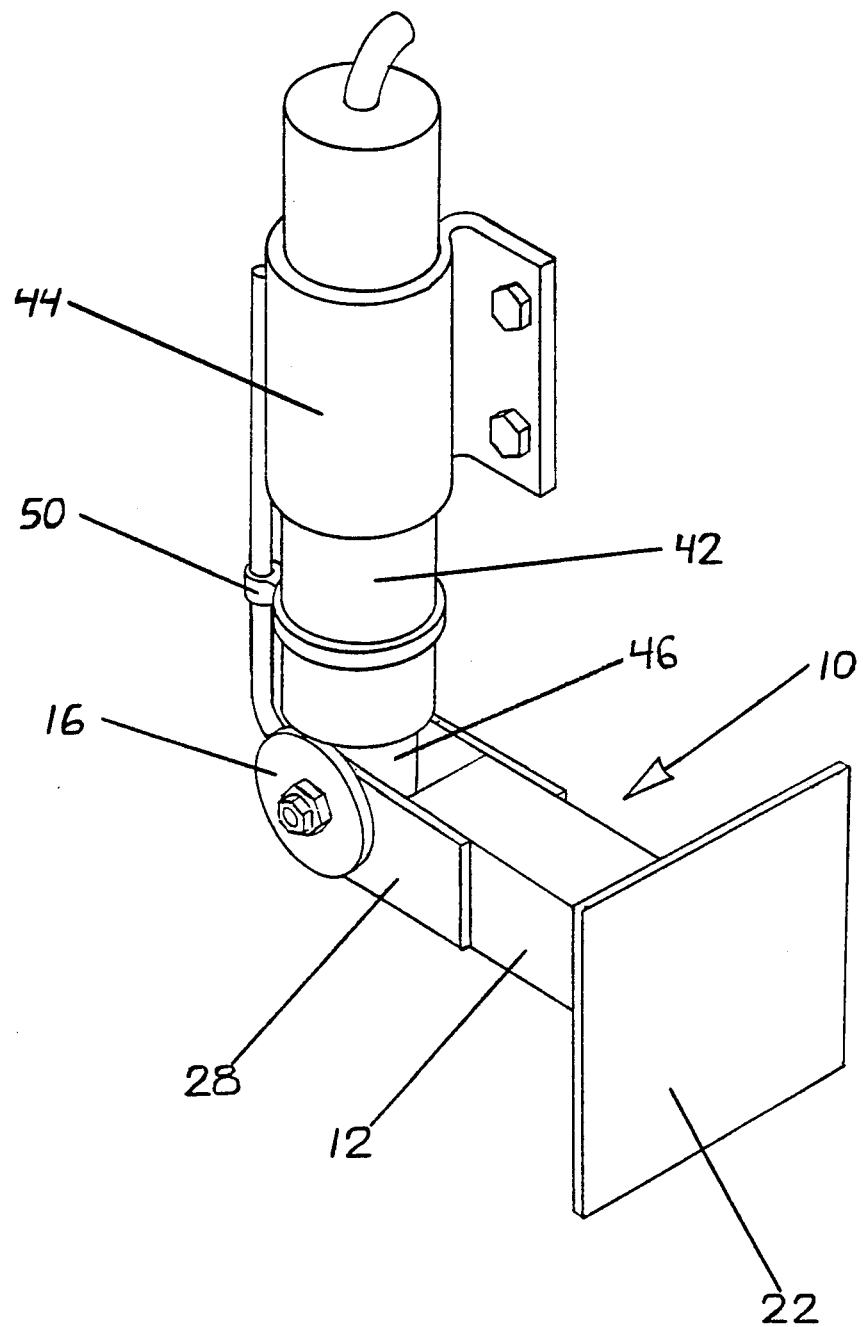
FIG. 5 of the drawing is a perspective view of the system of the invention in an "up" position.

The system of the invention, shown in FIGS. 4 and 5, comprises the device of the invention discussed above and a hydraulic cylinder. Preferably, the system of the invention further comprises means for mounting the hydraulic cylinder to the object to be leveled.

FIG. 4 illustrates the system of the invention in a "down" position and FIG. 5 illustrates the system of the invention in an "up" or "storage" position. The down position of FIG. 4 is the position of the system when the object is being or has been leveled. The up position of FIG. 5 is the position of the system when the object is being moved or not leveled.

During operation of the system of the invention in the down position shown in FIG. 4, the hydraulic cylinder rod 46 can be lowered or raised to either raise or lower the object being leveled. After leveling has been completed, the system of the invention remains fixed in place due to the hydraulic action. In this down position, the support leg 12 or support pad 22 is on the ground. The hydraulic cylinder casing 42 is mounted to the underneath side of the object to be leveled by mounting means 44, common to the art, such as a bracket which bolts to a frame underneath the object to be leveled. Thus, the hydraulic up and down movement of the rod 46 causes the object to be leveled to move up or down.

Preferably, the system of the invention further comprises anti-rotational means 50 so that the support leg 12 and hydraulic cylinder rod 46 will not rotate, radially, when the device is raised and lowered. This is useful, for example, when the operator wants exact positioning of the support leg 12 or support pad 22 on the ground.

FIG. 4 illustrates a preferred antirotational means 50 in which a rod and mounting bracket are attached to the hydraulic cylinder casing 42 and the hydraulic cylinder rod 46 so that they do not rotate radially relative to each other.

When the object to be leveled needs to be moved, the support leg 12 of the system of the invention pivots into the storage position shown in FIG. 5. This pivoting is accomplished as follows, starting from the down position shown in FIG. 4: The hydraulic cylinder rod 46 is raised into its casing 42. This is often called "power up" in the art. As the rod 46 is first being raised, the support leg 12 may stay on the ground as the object being leveled drops. Once the object being leveled has dropped, the support leg 12 then rises from the ground as the hydraulic cylinder rod 46 is drawn into its casing 42. The device of the invention 10 is automatically raised with the hydraulic cylinder 46 because the device 10 is attached to the hydraulic cylinder rod 46 by attachment means 14. The hydraulic cylinder casing 42 remains stationary. The hydraulic cylinder rod 46 and the device 10 travel upward in the same direction until the bottom of the hydraulic cylinder casing 42 makes contact with the top of the offset positioned wheel 16. When this contact is made, the force of this contact causes the device of the invention 10 to pivot upward, up to 90 degrees relative to the longitudinal axis of the hydraulic cylinder, as shown in FIG. 5. The dashed arrow 52 in FIG. 4 shows the direction of travel of the device. The hydraulic action holds the device of the invention 10 in its storage or up position (FIG. 5) so that the object to be leveled can be easily moved.

In an alternative embodiment, a contacting means other than the bottom of the hydraulic cylinder may be utilized to cause the pivoting of the device upward. For example, a plate or rod extending from the hydraulic cylinder or the object to be leveled could also make contact with the wheel as the device is raised and thereby create the force necessary to cause the device to pivot upward.

Preferably, the wheel 16 can rotate freely from the support leg 12; when the hydraulic cylinder casing 46 (or other contacting means) and the wheel 16 contact each other, the wheel tends to rotate slightly as the device 10 begins to pivot upwards. In an alternative embodiment, the wheel 16 is fixed relative to the support leg 12, although such an embodiment tends to cause more wear on the wheel 16 and the end of the hydraulic cylinder casing 42 (or other contacting means).

In the preferred embodiment of the invention comprising wheel adjustment means 20 for adjusting the position of the wheel 16, a slight repositioning of the wheel 16 enables an operator to control the pivoting angle of the device of the invention 10. A pivoting angle of less than 90 degrees might be useful, for example, to avoid hitting something jutting down from the object being leveled.

When the object needs to be leveled, the system of the invention operates as follows, starting from the up position shown in FIG. 5: The hydraulic cylinder rod 46 is lowered from its casing 42 ("power down"); the device of the invention 10 pivots down to a vertical position; the device 10 is lowered vertically along with the hydraulic cylinder rod 46; the support leg 12 or support pad 22 reaches the ground; the hydraulic cylinder rod 46 continues to move out of its casing 42; and the hydraulic action thereafter raises the object being leveled. If the object being leveled is raised too much, the hydraulic cylinder rod 46 can be withdrawn into its casing 42 to lower the object. The "power up" and "power down" features of the system of the invention allow for precise leveling adjustments.

For leveling objects such as trailers or mobile homes, at least three or four hydraulic leveling devices are useful to yield optimum leveling. Preferably, the hydraulic leveling devices are spaced evenly apart to cover different areas of the object being leveled. The size of the component parts of the system of the invention is dependent on the size and weight of the object being leveled.

The associated hydraulic, and operator control systems, which are utilized in conjunction with the device and system of the invention, are all common systems in the prior art. The operator control system may utilize buttons or switches which are pressed or flipped, or other common operational controls, to cause the "power up" and "power down" motions of the hydraulic cylinder. The system may be computerized to achieve optimum leveling or the operator may use "bubbles" attached to the frame of the object being leveled to determine which area of the object to be leveled needs to be raised or lowered. For a mobile home or road equipment, the controls are preferably located in the operator's cab so that the operator can easily use the system of the invention, without even needing to step outside the cab.

Although the invention has been described with reference to these preferred embodiments, other embodiments can achieve the same results. Variations and modifications of the present invention will be obvious to those skilled in the art and it is intended to cover in the appended claims all such modifications and equivalents.

I claim:

1. An apparatus for pivoting a leg relative to a hydraulic cylinder comprising:
   a leg having a longitudinal axis;
   means for pivotally attaching one end of said leg to one end of a hydraulic cylinder having a longitudinal axis, when provided, said means allowing said leg to pivot between an extended position substantially longitudinally aligned with the hydraulic cylinder and a storage position,
   a wheel; and
   attachment means for disposing said wheel on said leg near its one end at a position offset from the longitudinal axis of said leg, said wheel providing a circumferential bearing surface for contacting a selected part of the hydraulic cylinder during cylinder contraction and extension, thereby causing said leg to pivot relative to the hydraulic cylinder between said extended position and said storage position.

2. An apparatus in accordance with claim 1 wherein said wheel is substantially circular.

3. An apparatus in accordance with claim 1 wherein said wheel is nonrotatably disposed on said leg.

4. An apparatus in accordance with claim 1 wherein said wheel is rotatably disposed on said leg.

5. An apparatus in accordance with claim 1 wherein said wheel is permanently affixed to said leg.

6. An apparatus in accordance with claim 1 wherein said wheel is removably disposed on said leg.

7. An apparatus in accordance with claim 1 wherein said wheel attachment means comprises means for adjusting the position of said wheel on said leg.

8. An apparatus in accordance with claim 7 wherein said wheel comprises an aperture and said wheel position adjustment means comprises a stud, a sleeve fittable within said wheel aperture, said sleeve having an off center opening slidably fittable over said stud, and means for fixing said sleeve into a selected position on said stud to provide a desired wheel position on said leg.

9. An apparatus in accordance with claim 8 wherein said wheel is essentially circular and the aperture is substantially centrally disposed within said wheel.

10. An apparatus in accordance with claim 1 wherein the hydraulic cylinder comprises an inner rod and an outer sleeve having a lower edge, and the hydraulic cylinder is pivotally mountable to said leg at the end of its inner rod, said wheel is positioned on said leg to circumferentially engage the lower edge of the hydraulic cylinder sleeve upon the inside rod being drawn into and extended from within the outer sleeve of the hydraulic cylinder toward and from its contracted state.

11. An apparatus in accordance with claim 1 wherein said leg is pivotable from an extended position a preselectable amount up to about 90 degrees to a storage position.

12. An apparatus in accordance with claim 1 further comprising an anti-rotational rod means slidably affixable to the hydraulic cylinder.

13. An apparatus in accordance with claim 12 wherein said rod means comprises means for attachment to both rod and sleeve of a hydraulic cylinder, when provided.

14. An apparatus in accordance with claim 1 further comprising means for mounting the hydraulic cylinder, when provided, to an object to be leveled.

15. An apparatus in accordance with claim 1 further comprising pad means attachable to the second end of said leg to provide an extended surface to support a load on said leg.

* * * * *